Aug. 31, 1965  C. M. JAHN  3,203,087
NECKED RECEPTACLE SEAL CUTTER WITH A RATCHET TOOTH
Filed June 3, 1963
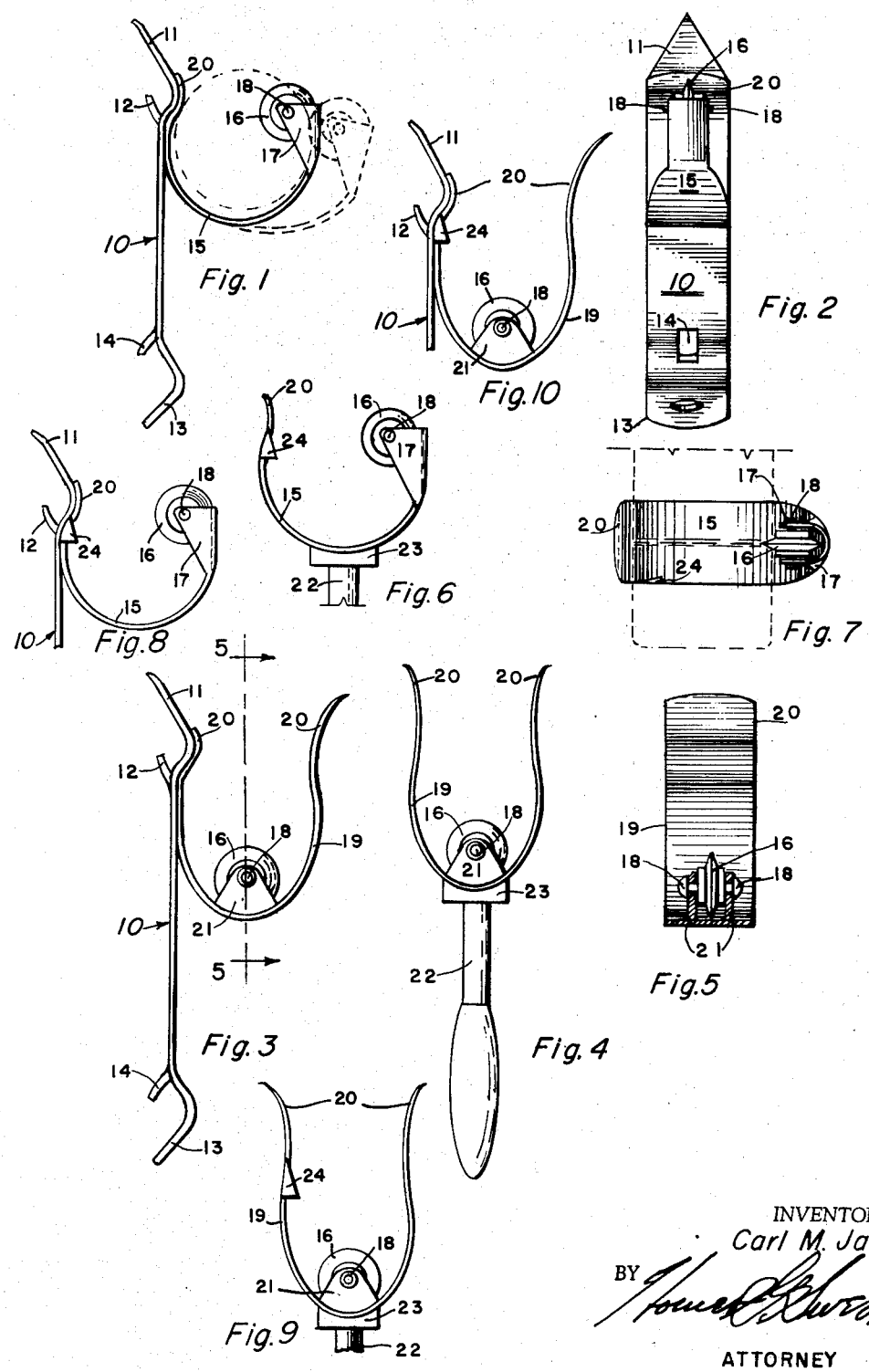
INVENTOR.
Carl M. Jahn.
BY
ATTORNEY

United States Patent Office 3,203,087
Patented Aug. 31, 1965

3,203,087
NECKED RECEPTACLE SEAL CUTTER WITH A RATCHET TOOTH
Carl M. Jahn, 2120 S. Joliet St., Denver, Colo.
Filed June 3, 1963, Ser. No. 285,065
5 Claims. (Cl. 30—1.5)

This invention relates to implements manipulable to facilitate access to the contents of conventional sealed beverage containers, such as bottles, cans, and the like, and more especially to container openers applicable in unitary organization to unclose sealed receptacles of diverse particularity conventionally utilized for commercial distribution of various beverages to the ultimate consumer, and has an object to provide a novel and improved opener tool unit of high utility and enhanced practical advantage.

A further object of the invention is to provide a novel and improved container opener unit that is selectively applicable to effect any and all of the several distinctive operations commonly incident to the release of contents from the various types of beverage containers generally in use.

A further object of the invention is to provide a novel and improved container opener unit that is convenient and natural of manipulation to positively effect any and all of the several distinctive operations incident to the release of contents from the various types of beverage containers generally in use with efficient ease and dispatch.

A further object of the invention is to provide a novel and improved container opener unit that is expedient of production in various specialized adaptations suited to specific purposes.

A further object of the invention is to provide a novel and improved construction and operative correlation of elements and features in and to constitute a container opener unit of unique capability.

A further object of the invention is to provide a novel and improved container opener unit that is simple of low-cost production, compact in a form immediately and constantly available for intended use, sturdily immune to impairment in long-continued, repetitious operation, and positive and efficient in attainment of the ends for which designed.

Specifically, the invention is a practical bottle seal cutter and bottle loosener tool featuring in diverse particularity and alternative associations with various manipulating means a revoluble cutter effective in one direction of tool rotation about the neck of a sealed bottle to sever the seal and a fixed complement effective in angular separation from said cutter to apply reverse rotation of the tool for consequent twist-loosening of the bottle stopper.

With the foregoing and other objects in view, my invention consists in the construction, arrangement, and operative combination of elements as hereinafter set forth, pointed out in the appended claims, and illustrated by the accompanying drawing, in which:

FIGURE 1 is a side elevational view of one practical embodiment of the invention as organized ready for multi-purpose use, one functional application of the illustrated arrangement being indicated by the broken line supplement to the view.

FIGURE 2 is an elevational view of the arrangement according to FIGURE 1 as exposed at the right-hand side of the latter.

FIGURE 3 is a side elevational view similar to FIGURE 1 illustrating a structurally-modified embodiment of the invention functionally equivalent to that represented by FIGURES 1 and 2.

FIGURE 4 is a side elevational view similar to FIGURES 1 and 3 showing a specialized adaptation of previously-disclosed features within the contemplation of the invention.

FIGURE 5 is a sectional view taken through and substantially on the indicated line 5—5 of FIGURE 3.

FIGURE 6 is a partial side elevational view representing certain features of the arrangements according to FIGURES 1 and 4 as combined and modified for specialized functional advantage, the major portion of a manipulating handle component being omitted to conserve space.

FIGURE 7 is an upper end plan view of the adaptation according to FIGURE 6 as applied to intended use in association with the sealed neck end of a bottle represented by broken lines.

FIGURE 8 is a partial side elevational view of the arrangement according to FIGURE 1 as modified in the manner evidenced by FIGURE 6.

FIGURE 9 is a partial side elevational view of the arrangement according to FIGURE 4 as modified in the manner evidenced by FIGURE 6.

FIGURE 10 is a partial side elevational view of the arrangement according to FIGURE 3 as modified in the manner evidenced by FIGURE 6.

Many liquids, including the extensive category of beverages, are packaged for supply to the ultimate user in sealed containers difficult to open without the aid of an implement appropriate for the purpose. Commonly, and as is well and widely known, sealed liquid containers infeasible of being conveniently opened without suitable mechanical aid are of three general types differing in the form and style of the closure elements controlling access to the contents and requiring, in consequence, correspondingly distinctive tools to accomplish desired opening operations. In one type class the containers are closed by means of transverse end webs fixedly sealed to the container body in an association necessitating rupture of one of the webs to release the container charge; in another type class the containers are formed with terminally-beaded, tubular necks seal-closed through coaction with crown caps crimped thereover; and in the third type class the containers are formed with tubular necks stopped by headed corks or screw caps shrouded within a tight thimble of tough material that substantially inhibits removal of the covered cork or cap until itself circumferentially incised or cut away. Obviously, expedient rupture of a container end web closure is had through the agency of a terminally-pointed lever applied with a prying action to puncture and tear the web, removal of crown caps results from a levering action applied through a tool or fixture in hooked engagement with the crimped edge of the cap to tilt the latter relative to the container, and conditioning for detachment of the thimble-shrouded corks or caps is attained by cutting through the material of the thimble about the neck at the line of stopper separation therefrom. While implements effective to accomplish the separate opening operations characteristic of the different types of containers above discussed have long been known and available in a considerable diversity of structural detail, no single opener implement capable of effectively performing all three such distinctive operations has been hitherto provided, and the instant invention is hence directed to the provision of a compact, inexpensive, unitary opener facility efficiently and conveniently manipulable to execute each of the requisite several opening operations as occasion may arise.

Distinguished by simplicity and low cost of production, the embodiment of the invention represented by FIGURES 1 and 2 is a compact, unitary organization ingeniously incorporating and extending the utility of a well-known type of implement formed in some diversity of size and detail to serve as an opener effective to selectively detach crown caps from and to rupture end web closures of containers. Conventionally constituted substantially as illustrated, the familiar opener availed of to realize the purposes of the present invention is characterized by a straight, flat bar 10 of rigid material formed to provide at one end an obliquely-divergent penetrating point 11 spacedly overhanging a lug 12 struck outwardly from the bar and to establish at its other end a similar, but blunt, obliquely-divergent offset 13 spacedly overhanging a lug-type hook 14 struck from the bar. Operated as a lever with the lug 12 engaged under the bead of a web-closed container and the point 11 opposed to the end web thereof the opener comprised from the bar 10 functions to open a triangular access passage through the web and with the hook 14 clipped under the crimped edge of a crown cap popped to the end of the offset 13 the opener functions to tilt the cap to separation from an associated container, all as is known and established practice.

In accordance with the concept and to realize the advantages of the invention, the dual-function opener typified by the bar 10 fixedly mounts and is functionally supplemented by means selectively applicable to sever for release the sealing thimbles shrouding stoppered ends of container necks, whereby to complete a unit suited to open the several common types of beverage containers without recourse to other facilities. Termed for convenient reference a seal cutter, the means adjunctive to the opener typified by the bar 10 consists, as shown in FIGURES 1 and 2, of an interrupted annular band 15 of suitable stiffly-resilient material, such as spring steel, securely affixed at one end by welding, brazing, or the like, to and in overlying relation with the face of the bar 10 opposite to that interrupted by the elements 12 and 14 and inwardly adjacent an end of the bar to outstand laterally of the bar with the band interruption opening longitudinally of the bar and outwardly thereof past the adjacent bar end, and a revoluble cutter 16 carried by the end of the band 15 remote from that affixed to the bar for rotation about an axis parallel to the width plane of the bar with an arc of the cutter exposed intrusively of the band interruption. While the band 15 is shown in FIGURES 1 and 2 as attached to the end of the bar terminating in the point 11, it is manifest that a corresponding association of the band and its cutter with the other end of the bar is an optional variation immaterial to the function and mode of operation of the combination. Location of the cutter 16 at the free end of the band 15 accommodates an economical operative mounting of the cutter head, as shown, between complementary ears 17 inturned to parallel relation from side margins of the band end on a pin 18 perpendicularly spanning between said ears. Associated with either end of the bar 10 to open longitudinally and outwardly thereof, the band 15 is constrictively and resiliently tensioned to normally embrace more than one-half of an area appropriate to receive a thimble-sealed container neck of customary size and to dispose the cutter 16 as an intrusion radially obstructing said area outwardly from the half portion thereof closed by the band, whereby, as indicated by the broken line showings of FIGURE 1, engagement of a thimble-sealed container neck in and through the interruption of the band 15 with the cutter registered on the line of separation between the neck and its stopper effects an outward displacement of the cutter against the tension of the band which results in reception of the container neck within the band subject to incising action of the cutter under the urging of the band tension, in which correlation the cutter serves to yieldably retain the container neck against escape from the band and reflects rotation of the implement about the said neck by means of the bar 10 as a circumferential incision of the thimble-seal material effective to release the neck stopper for detachment from the container. As should be fully apparent, the organization and resilient property of the seal cutter qualifies the so-equipped implement for intended use in application to thimble-sealed container necks of considerable size variation. Preferred for simplicity of economical production and facility of intended operation, the arrangement represented by FIGURES 1 and 2 is an implement of significant convenience and utility.

Fully duplicating the capabilities of the structural organization just described, the modification represented by FIGURES 3 and 5 is an integrated combination of a seal cutter with a conventional bar-type opener characterized by the elements 10, 11, 12, 13 and 14 the same, save perhaps for size, as that hereinabove discussed and differs from the preferred embodiment according to FIGURES 1 and 2 but in an alternative arrangement of the elements constituting the seal cutter. Distinguishing the modification according to FIGURES 3 and 5 is the substitution for the interrupted annular band 15 of a U-shaped clip 19 of stiffly-resilient, strip material conformed in a size to receive thimble-sealed container necks generally prevalent as a relatively-deep pocket opening through a moderately-restricted throat and thence outwardly between divergent terminals 20, and location of the revoluble cutter 16 at the concave base of such pocket in opposition to the clip opening to rotate freely on its pin 18 engaged to span parallel to the width of the clip strip material between webs 21 fixedly instanding from the innermost arc of the pocket. Fixed at one side in overlying relation with the bar 10 to open outwardly and longitudinally from one end of the bar in an association essentially the same as that of the band 15, the clip 19 mounting the cutter 16 as shown and described is manipulable by means of the bar 10 to function as a seal cutter when applied with some thrust longitudinally of the bar to embrace a container neck entered through the resiliently-yieldable restricted throat of the clip to reception within the clip pocket in an adjustment such as to register the salient arc of the cutter 16 with the conjunction of the line of separation marking the conjunction of the container neck and the stopper to be unsealed, whereby, as is readily apparent, to apply rotation of the so-engaged implement for effective incision and release of the sealing thimble.

Primarily adapted for advantageous use in beverage-dispensing establishments, such as bars, taverns, and the like, which customarily are equipped with fixtures employable to remove crown caps and to rupture end web closures of containers, the specialized adaptation represented by FIGURE 4 utilizes the U-shaped clip 19 mounting the cutter 16 in opposition to the opening separating the terminals 20 as illustrated and just above described to function as a seal cutter independently of and out of association with the bar-type opener typified by the element 10. The clip 19 operatively mounting the cutter 16 within and at the base of the clip-defined pocket being available, provision of a manipulating handle 22 of any expedient particularity in fixed attachment to the clip, desirably at the convexity of the clip opposed to the webs 21 mounting the cutter and feasibly through the agency of a reinforcing and stiffening boss 23, suffices to qualify the seal cutter for its intended use as hereinbefore set forth and to complete a unitary implement of manifest merit.

Similarly, and as represented by FIGURES 6 and 7, the band 15 carrying the elements 16, 17 and 18 in the arrangement according to FIGURES 1 and 2 hereinbefore explained may be conditioned in detachment from the bar-type opener typified by the element 10 through provision of a handle 22 and its boss 23 to serve as a seal cutter implement in the same manner as the adaptation illustrated by FIGURE 4.

However specifically constructed and arranged within the disclosure and contemplation of the present invention, the seal cutter characterized by the stiffly-resilient band or clip operatively mounting the revoluble cutter in the manner and for the purpose herein set forth may manifest extended specific utility when formed with a pointed detent 24 fixedly offset from an edge margin of the band or clip material to intrude slightly, as shown in FIGURES 6, 7, 8, 9 and 10, within the area bounded by the band or clip in position to bear at its point against the periphery of a container neck engaged for incision of its thimble seal by the seal cutter implement. Applicable as a supplement to each of the seal cutter organizations herein exemplified, the detent 24 projects inwardly from the edge margin of the associated band or clip substantially perpendicular to the width plane of the band or clip material inwardly adjacent the band or clip opening in approximate opposition to the cutter 16 as terminally mounted upon the band 15 and in spacedly-overhanging relation with the cutter as carried by the clip 19, whereby to track parallel to and at one side of the path traced by the cutter during intended operation of the implement, in either of which dispositions said detent presents an inclined margin at its edge contiguous to the band or clip opening terminating in a point where and as intersected by the convergent other margin of the detent directed more nearly radial of the band or clip concavity. Conformed and disposed as just described, the detent 24 is in effect a ratchet tooth imposing no significant resistance to operative engagement of the so-equipped implement with and for rotation in one direction about a thimble-sealed container neck thereby to be incised while opposing rotation of the implement in the other direction about the container neck in consequence of detent point bite in the material of the thimble seal and underlying element at one side of the cutter path about the neck, so that, the implement being appropriately applied to a thimble-sealed container neck to register the cutter with the conjunction of the neck and its stopper and to engage the point of the detent 24 against the periphery of the stopper adjacent such conjunction, rotation of the implement on the container neck in a direction to ratchet the detent about the stopper effects incision of the thimble seal, whereafter reverse rotation of the implement acts by virtue of detent point bite peripherally of the stopper, augmented if requisite through manual constriction of the band or clip, to twist and initially loosen the stopper, whether of cork or screw cap type.

Since changes, variations, and modifications in the form, construction, and arrangement of the elements show and described may be had without departing from the spirit of my invention, I wish to be understood as being limited solely by the scope of the appended claims, rather than by any details of the illustrative showing and foregoing description.

I claim as my invention:

1. A beverage container opener comprising a seal cutter component formed as a stiffly-resilient, interrupted, arcuate band yieldably adaptable to embrace the neck of a container and a single revoluble cutter carried by said band for rotation intrusively of the band-defined area on and about an axis perpendicular to the median plane of the band, means on said band effective in one direction of band manipulation to oppose angular displacement of the band relative to container features embraced thereby, and means affixed exteriorly to said band for rotational manipulation thereof in opposite directions.

2. The organization according to claim 1, wherein said band is generally annular in an extent exceeding a semicircle, the revoluble cutter is carried by and intrudes from an end of the band established by the interruption thereof, the means effective to oppose band manipulation in one direction about features of an associated container is spaced angularly of the band from said cutter, and the means for rotational manipulation of the band is a handle fixedly outstanding tangentially from the arc of the band opposed to the band interruption.

3. The organization according to claim 1, wherein said band is generally annular in an extent exceeding a semicircle, the revoluble cutter is carried by and intrudes from an end of the band established by the interruption thereof, the means effective to oppose angular displacement of the band relative to the container is a pointed detent fixedly intruded in spaced parallelism with the plane of the revoluble cutter from a side margin of the band adjacent the end thereof opposed to that carrying the cutter, said detent being formed by the convergence of one edge margin inclined inwardly of the band from the band interruption and a complementary edge margin substantially radial of the band to function as a ratchet tooth directed inwardly of the band and away from the interruption separating said detent and cutter, and the means for rotational manipulation of the band is a handle fixedly outstanding radially from the arc of the band opposed to the band interruption.

4. The organization according to claim 1, wherein said band is contoured as a U-shaped clip having a relatively-deep pocket opening through a restricted throat outwardly between divergent terminals, the revoluble cutter is carried by and intrudes from the inner base arc of the pocket opposed to said throat, the means effective to oppose band manipulation in one direction about features of an associated container is spaced angularly of the band from said cutter, and the means for rotational manipulation of the band is a handle fixedly outstanding from the outer base arc of the pocket away from the position of the cutter.

5. The organization according to claim 1, wherein said band is contoured as a U-shaped clip having a relatively-deep pocket opening through a restricted throat outwardly between divergent terminals, the revoluble cutter is carried by and intrudes from the inner base arc of the pocket opposed to said throat, the means effective to oppose angular displacement of the band relative to the container is a pointed detent fixedly intruded in spaced parallelism with the plane of the revoluble cutter from a side margin of the band adjacent and at the pocket side of the restricted throat, said detent being formed by the convergence of one edge margin inclined inwardly of the band from said throat and a complementary edge margin substantially radial of the pocket to function as a ratchet tooth directed inwardly of the pocket and away from the throat in angularly-spaced, overhanging relation with the cutter, and the means for rotational manipulation of the band is a handle fixedly outstanding from the outer base arc of the pocket away from the position of the cutter.

References Cited by the Examiner

UNITED STATES PATENTS

| | | | |
|---|---|---|---|
| 940,396 | 11/09 | Lemm | 30—1.5 X |
| 1,546,629 | 7/25 | Dawe | 30—1.5 X |
| 2,271,308 | 1/42 | Ross | 30—1.5 |
| 2,276,268 | 3/42 | Donlon | 30—1.5 |
| 2,439,894 | 4/48 | John et al. | 30—1.5 |

FOREIGN PATENTS

| | | |
|---|---|---|
| 839,319 | 5/52 | Germany. |

WILLIAM FELDMAN, *Primary Examiner.*